US009180066B2

(12) United States Patent
Izard et al.

(10) Patent No.: US 9,180,066 B2
(45) Date of Patent: Nov. 10, 2015

(54) SUPPORTING WALKING AID

(75) Inventors: Philippe Izard, Toulouse (FR); Herve Escourrou, Villeneuve Tolosane (FR)

(73) Assignee: SAFE STEP AND WALK MOVEMENT, Ramonville Saint Agne (FR)

( * ) Notice: Subject to any disclaimer, the term of this patent is extended or adjusted under 35 U.S.C. 154(b) by 0 days.

(21) Appl. No.: 14/358,556

(22) PCT Filed: Nov. 18, 2011

(86) PCT No.: PCT/EP2011/070499
§ 371 (c)(1),
(2), (4) Date: May 15, 2014

(87) PCT Pub. No.: WO2012/066137
PCT Pub. Date: May 24, 2012

(65) Prior Publication Data

US 2015/0123365 A1 May 7, 2015

(51) Int. Cl.
*B62B 3/00* (2006.01)
*A61H 3/04* (2006.01)
*A61H 3/00* (2006.01)

(52) U.S. Cl.
CPC .................. *A61H 3/04* (2013.01); *A61H 3/008* (2013.01); *A61H 2201/0184* (2013.01); *A61H 2201/5061* (2013.01); *A61H 2201/5064* (2013.01); *A61H 2201/5084* (2013.01); *A61H 2201/5092* (2013.01)

(58) Field of Classification Search
CPC ............ B62B 3/02; B62B 3/10; A63C 17/01; B62K 3/002; B60N 2/2806; B60N 2/2854
USPC ................ 280/87.021, 87.041, 87.05, 47.34, 280/47.35, 658; 135/66–67
See application file for complete search history.

(56) References Cited

U.S. PATENT DOCUMENTS 5,794,639 A * 8/1998 Einbinder ....................... 135/67
2005/0288157 A1 * 12/2005 Santos-Munne et al. ....... 482/66

FOREIGN PATENT DOCUMENTS

WO 2006/014533 A2 2/2006
WO 2008/145669 A1 12/2008

* cited by examiner

*Primary Examiner* — Brodie Follman
*Assistant Examiner* — James Triggs
(74) *Attorney, Agent, or Firm* — Im IP Law PLLC; C. Andrew Im

(57) ABSTRACT

A walking aid supporting the weight of the body of an aided person. The walking aid being programmable and specialized according to each of the left and right bearings. The walking aid comprises a support structure mounted on wheels and includes a bottom element and a top element for supporting the person. The top element being rendered mobile relative to the bottom element along a vertical axis by a sliding system actuated by an actuator system. The aid comprises a system of gravitational-force sensors, which performs the weighing of the top element, and a system for measuring the position of the lower limbs of the person. The actuator system is controlled by the system of gravitational-force sensors, and is further controlled by a system for programming and managing support based on the measurement of the position of the lower limbs of the person.

12 Claims, 3 Drawing Sheets

SUPPORTING WALKING AID

RELATED APPLICATIONS

This application is a §371 application from PCT/EP2011/070499 filed Nov. 18, 2011, which is incorporated herein by reference in its entirety.

TECHNICAL FIELD OF THE INVENTION

The present invention relates to a real walking aid device supporting an assisted individual.

In the present description, the expression “real walking” should be understood to mean that the device enables the individual who is using it to really move around in space, unlike the walking aid devices on treadmills or in reeducation pools. On the contrary, the device according to the invention can be likened to a rolling walker. The expression “supporting” should be understood to mean that the device is of the type that assists the walking by relieving the individual of some or all of his or her own weight. The support can thus be partial or total.

Generally, the device according to the invention is of the type recreating the walking context in a reeducation pool, but in real situation on the ground.

BACKGROUND OF THE INVENTION

Walking aid devices for individuals are currently known, notably implemented in the context of reeducation for recovering the patient’s motor skills. Devices of this kind that can be cited include rolling walkers, consisting of a structure intended to support the weight of the assisted individual and mounted on castors. This type of device, while it allows for real deambulation, does however prove insufficient to allow for a support of the individual that is suited to his or her specific motricity problems, and/or to an active reeducation that evolves and is perfectly appropriate to each individual, whatever his or her particular needs are. Furthermore, the support in this case is provided only by the force of the arms of the user, which is unsatisfactory from the point of view of usage comfort.

OBJECT AND SUMMARY OF THE INVENTION

The present invention aims to remedy the drawbacks of the supporting walking aid devices proposed by the prior art, notably as explained above, by proposing such a device which is suitable for taking into account the specific motor deficiencies of each individual, and for providing him or her with perfectly appropriate real walking assistance. The invention also aims for this device to offer a high degree of usage comfort.

To this end, there is proposed, according to the invention, a real walking aid device supporting the weight of the body of an assisted individual, this support being programmable and differentiated according to each of the right or left bearings of the individual. This device comprises:

- a support structure mounted on wheels, which comprises a top element intended to support the individual and a bottom element intended to bear on the ground, the top element being made mobile relative to the bottom element on a vertical axis by the interposition of a sliding system which is actuated by an actuator system suitable for raising the top element relative to the bottom element and for thus raising the assisted individual;
- a system of gravitational force sensors suitable for weighing the top element supporting the assisted individual;
- a system for measuring the position of the lower limbs of the individual, that is to say his or her legs. “Measuring the position of the lower limbs of the individual” should be understood to mean determining the relative position of each of these lower limbs either relative to one another, or relative to one or more fixed points on the device, or relative to the ground, or even determining their speed of displacement, or any other parameter making it possible to determine which of these lower limbs is in a phase of bearing on the ground and which is in a so-called lift phase, defined as the phase that comes between two successive phases of one and the same lower limb bearing on the ground.

According to the invention, the actuator system is slaved to the system of gravitational force sensors and it is controlled by a support programming and management system, based on the measurement of the position of the lower limbs of the individual performed by the system for measuring the position of the lower limbs of the individual.

The device according to the invention facilitates deambulation by reducing gravity through support, and in a differentiated manner for each lower limb of the individual. The support of the assisted person is global, in that it relates to the body taken en bloc and as a whole. While walking, this support can be programmed accurately, and it is advantageously differentiated according to each of the right or left bearings of the individual, that is to say according to which of his or her lower limbs is bearing on the ground. It is thus possible to adjust the support, by acting on the raising height of the top element relative to the bottom element, according to the specific needs of the assisted individual, for each of his or her right lower limb and his or her left lower limb.

Preferentially, the device according to the invention also comprises means for quantifying the support, implementing the system of gravitational force sensors and the support programming and management system. The support can thus be quantified accurately, notably according to each of the right or left bearings, so that the advances and regressions of the individual, for each of his or her right and left lower limbs, can be evaluated and quantified in time. This in particular proves totally advantageous in the context of reeducation in the walking of the individual.

The adjustment of the gravitational stresses to which the assisted individual is subject allows patients with reduced mobility to gradually take back control. This provides a benefit for the motricity of the lower limbs and for the recovery of the motor skills of the patient as well as an increasingly upright stance that has hitherto been impossible. The use of this device additionally offers the advantage of reinforcing the participation of the patient and his or her engagement in the care procedure; it forces the patient into a process of empowerment. This device advantageously addresses the issues raised by any pathology of the musculoskeletal system of a traumatic, orthopedic or degenerative origin, whether transient or permanent. The use of this device is all the more beneficial for patients incapable of walking who are also affected by general pathologies, such as neurological, cardiopulmonary or metabolic pathologies, because it prevents the damaging consequences of the immobilization.

Compared to the existing devices offered by the prior art, the device according to the invention notably offers the advantages of:

- allowing a real deambulation, since it operates neither with a treadmill nor in a reeducation pool, ensuring an overall support of the individual, and not only partial, that is to say not affecting only a single part of the body, accurately quantifying the support provided for the assisted individual, providing a support that needs not be identical between right bearing and left bearing.

It is in fact this last feature which opens up real therapeutic prospects: offering permanent adaptivity and falling within the framework of a genuine progression of the walking motor skill. The device according to the invention is also particularly suited to a use allowing empowerment of people in the home.

A method for implementing the device according to the invention comprises the steps consisting in deducing, from measurement data concerning the position of the lower limbs of the individual relative to the data recorded by the system of gravitational force sensors, which lower limb of the assisted individual is bearing on the ground; programming a previously defined support for each of the right or left bearings of the individual and sequencing the different phases of the use of the device in an automatic mode which proceeds as follows:

weighing phase characterized by the total lifting of the assisted individual supported by the top element, that is to say the lifting of the top element relative to the bottom element until the feet of the individual are no longer bearing on the ground, and storage of the weight value measured by the system of gravitational force sensors, phase of programming the percentage of support for the weight of the body of the assisted individual for each of the right and left bearings, assisted support phase, having the possibility of dissociating, for each footstep, a support corresponding to the left bearing and a support corresponding to the right bearing, stop phase which immediately stops the movement of the actuator system in the total lift position.

The device according to the invention can also be implemented in a manual mode, providing the same support for the two lower limbs of the individual, this support being set initially by adjusting the height of the top element relative to the bottom element.

According to preferred embodiments, the invention also meets the following specifications, implemented separately or in each of their technically feasible combinations.

In preferred embodiments of the invention, the top element comprises a so-called insertion rod to which is fastened a positioning seat for the individual intended to position the individual and to raise him or her at the level of the pelvis. Such a feature advantageously ensures that the support of the individual is global, that is to say supports all his or her weight.

In order to meet an additional objective of the invention, which is to ensure that the device offers a high degree of usage comfort for the assisted individual, the positioning seat preferably comprises a shell comprising a perineal seat, an anterior pubic support and a posterior lumbar support.

Preferentially, the top element comprises an accommodation arc limited, at the rear relative to the direction of walking of the assisted individual, by a safety bar that can be closed, and the posterior lumbar support of the shell is pinned to this posterior safety bar, which advantageously ensures a high degree of safety in the use of the device.

In preferred embodiments of the invention, the system of gravitational force sensors consists of one or more strain gauge force sensors making it possible to weigh the top element supporting the assisted individual. Preferentially, the system of gravitational force sensors is placed in the mediosagittal position under the insertion rod of the positioning seat for the individual, so that the accuracy of the weighing of the top element supporting the individual, performed by this system, is high and the weighing values obtained are representative of the real weight of the individual when the top element is in the total lift position relative to the bottom element, a position in which none of the lower limbs of the individual is bearing on the ground.

According to an advantageous feature of the invention, the actuator system comprises means for lifting the top element relative to the bottom element and supporting means differentiated according to each of the right or left bearings of the individual. These means may consist of a single member, for example a cylinder with a foot yoke that is fixed to the bottom element and a rod yoke that is fixed under the insertion rod of the seat.

Preferentially, these means are differentiated, and the actuator system comprises a so-called lifting cylinder, comprising a foot yoke and a rod yoke, the foot yoke being fixed to the bottom element and the rod yoke being fixed under the insertion rod of the seat, this lifting cylinder exhibiting a greater travel and a lower actuation speed; and a so-called supporting cylinder for differentiated support according to each of the right or left bearings, also able to ensure a relative movement of the top element relative to the bottom element on a substantially vertical axis, and exhibiting a shorter travel and a greater actuation speed than the lifting cylinder.

In preferred embodiments of the invention, the system for measuring the position of the lower limbs of the individual consists of distance sensors, that can be infrared sensors, notably placed on the front of the bottom element relative to the direction of walking of the individual, and capable, while the individual is walking, of detecting the distance d which separates them from each lower limb of the individual. Such sensors advantageously make it possible to determine, in real time, which of the lower limbs of the assisted individual is in leader phase, also called lift phase, and is about to bear on the ground, and which of these limbs is static.

The invention does not in any way preclude any other embodiment of the system for measuring the position of the lower limbs of the individual, such as accelerometers fixed to the respective lower limbs of the individual for example.

According to a preferred feature of the invention, the support programming and management system is included in a control unit, which also comprises means for controlling the actuator system and the system of gravitational force sensors. This control unit is preferably arranged at the level of the top element of the device, so as to be accessible for the assisted individual positioned in the device in such a way as to be supported by this top element.

Preferentially, these control means can be actuated by the individual so as to be able to manually set, at any time, the position heightwise of the top element relative to the bottom element. Such a feature notably proves totally advantageous in that it makes it possible to limit the transfers of the individual throughout his or her day. For example, the height of the top element of the device can easily be set such that the device can fit under a table, the individual then being positioned relative to the table in such a way that his or her arms can rest thereon and he or she can eat, write, work, etc., without having to leave the walking aid device according to the invention.

In preferred embodiments of the invention, the device is supplied with power by an energy storage system consisting of one or more portable electric batteries, preferably rechargeable, and preferably fixed onto the base of the bottom element.

The wheels on which the device rests, and more particularly the bottom element, are also preferentially of multidirectional type. At least one of them is also preferentially equipped with braking means and/or immobilizing means. This increases the maneuverability and the safety of use of the device.

BRIEF DESCRIPTION OF THE DRAWINGS

The invention will now be more precisely described in the context of preferred embodiments, which are in no way limiting, represented in FIGS. 1 to 5*c*, in which.

DETAILED DESCRIPTION OF THE EMBODIMENTS

Figure 1:
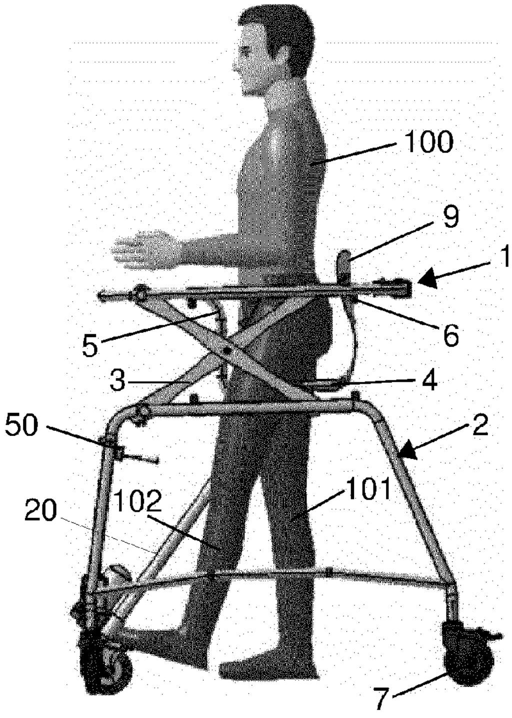
FIG. 1 represents a device according to the invention in which an individual is positioned, supported in his or her walking, seen from the side.
Figure 2:
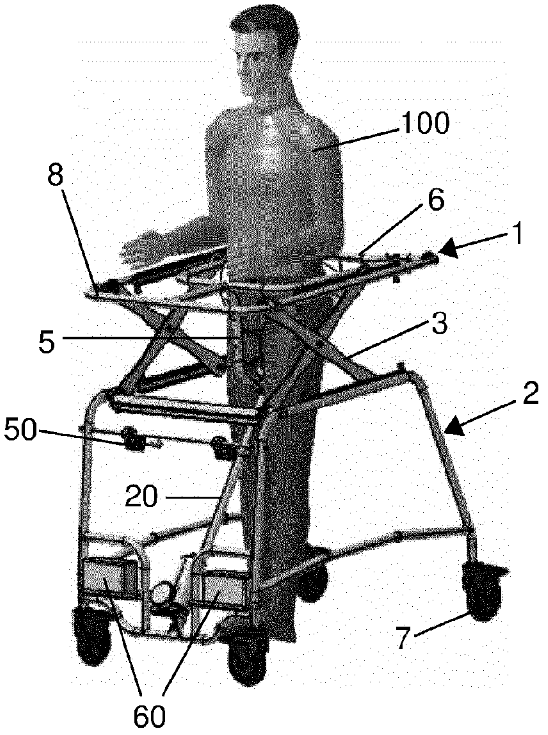
FIG. 2 shows the device and the individual of FIG. 1, from a three-quarter view.

An exemplary embodiment of a real walking aid device according to the invention based on the support of an assisted individual 100 is represented in FIGS. 1 and 2.

This device comprises a support structure comprising a top element 1 and a bottom element 2 securely attached to one another. The bottom element 2 rests on the ground by wheels 7 of which there are preferably three, more preferably four, distributed at the four corners of the bottom element 1 so as to obtain the best possible stability on the ground. The wheels 7 are preferably of multidirectional type, and at least one of them is preferably provided with a braking and/or immobilizing system.

The individual 100 is represented in these FIGS. 1 and 2 in a so-called operating position, in which he or she is supported by the top element 1.

The top element 1 and the bottom element 2 are mutually mobilized, that is to say that the top element 1 is made mobile on a substantially vertical axis relative to the bottom element 2, by a sliding system, for example, in the particular embodiment represented in FIG. 1, by an x-configuration four-bar system 3, extending between the bottom element 2 and the top element 1 and having four anterior pivot links and four posterior slide links.

Such an embodiment of the sliding system is however in no way limiting on the invention, which applies similarly to any other system known to those skilled in the art, such as, for example, a sliding guiding means of slideway type.

The device also comprises a so-called insertion rod 5, incorporated in the top element 2, preferably arranged substantially in a medio-sagittal position relative to the individual, and to which is fixed a seat 4 for positioning and accommodating the assisted individual 100. In the embodiment represented in the figures, the insertion rod 5 extends from a top part of the top element 2, to the seat 4. In other preferred embodiments of the invention, not represented in the figures, the insertion rod 5 is arranged under the seat 4, very slightly forward relative to the medio-sagittal position.

The positioning seat 4, represented in FIG. 1, is intended to position the assisted individual and to raise him or her at the pelvis. It preferably, but in a nonlimiting way, consists of a thermoformed shell, comprising a perineal seat and an anterior pubic support. This seat system can be complemented by a posterior lumbar support 9 fixed to a posterior safety closure bar 6, which delimits, with another constituent element of the top element 1, namely an anterior accommodation arc 8, a space for accommodating the assisted individual. The posterior safety closure bar 6 is preferably associated with means for controlling its closure, notably visual means, such as a light indicator, which emits a signal when the closure bar 6 is correctly closed.

This FIG. 1 also shows the incorporation of the seat 4 in the support structure, as well as the position of a system for measuring the position of the lower limbs 50, that is to say the legs, respectively 101, 102, of the individual 100. In the embodiment of the invention represented in FIGS. 1 and 2, this measurement system comprises two sensors for locating the lower limbs which are arranged on the bottom element 2, substantially at knee-height, forward relative to the individual in the direction of walking, and in such a way as to be directed toward said individual.

Preferentially, these sensors 50 are sensors of infrared type, or of any other type making it possible to measure the distance which separates them from each lower limb 101, 102 of the individual 100.

Any other intrinsically conventional system for measuring the position of the lower limbs of the assisted individual 100 also falls within the framework of the invention, in as much as this system makes it possible to determine which of the lower limbs is bearing on the ground, at any given moment, or which will be the next to do so. In particular, systems of the type with accelerometers, mounted on each of the lower limbs 101, 102 of the individual, or systems that are arranged at the level of the shoes of the individual 100, for detecting a contact with the ground, may be used in the context of the invention.

As illustrated more visibly in FIG. 2, which illustrates the device in which the assisted individual 100 is represented, by a three-quarter view, the top element 1 preferably takes the form of an anterior accommodation arc 8, arranged substantially horizontally, to which is fixed the insertion rod 5 of the positioning seat 4 for the individual, the x-configuration four-bar system 3, and the posterior safety closure bar 6. This safety closure bar 6 delimits, with the anterior arc 8, the space of reception and freedom for the assisted individual.

The bottom element 2 takes the form of a kind of parallelepiped open at the rear, mounted on the four wheels 7, to which is fixed the bottom part of the x-configuration four-bar system 3.

The device also comprises an actuator system 20, which actuates the sliding of the sliding system 3, which can be linear of cylinder type, and which makes it possible to raise the top element 1 relative to the bottom element 2 and thus raise the assisted individual resting on the positioning seat 4. This actuator system can be of any type known to those skilled in the art. It comprises, for example, a so-called lifting cylinder, the foot yoke of which is fixed to the bottom element 1 and the rod yoke of which is fixed under the insertion rod of the seat 5. Such an embodiment of the actuator system is in no way limiting on the invention, and any other means known per se also falls within the context of the invention, provided, however, it allows a movement substantially in the vertical direction of the top element 1 relative to the bottom element 2.

The electrical energy necessary to the operation of the device, notably of the actuator system 20 and of the system 50 for measuring the position of the lower limbs of the individual 100, is preferably supplied by a system of portable electrical batteries 60, preferably rechargeable from the mains. The same applies for all the other members that make up the device according to the invention that require such an energy supply.

The bottom end of the actuator 20, the system for measuring the position of the lower limbs 50 and the batteries 60 are preferably fixed to the bottom element 2.

The device also comprises a system of gravitational force sensors, which is not visible in FIGS. 1 and 2 and which preferably consists of strain gauge force sensors 30, mounted under the insertion rod of the seat 5, preferentially on the axis of the actuator 20. This system of gravitational force sensors makes it possible to weigh the top element 1, which includes the weight of the assisted individual 100 in a maximum lift position of the top element 1 relative to the bottom element 2, in which the weight of the individual is no longer resting on his or her feet but entirely on the positioning seat 4.

The device according to the invention also comprises a support programming and management system, which is not visible in FIGS. 1 and 2, and which controls, as a function of data that it receives from the system of gravitational force sensors 30 and from the system for measuring the position of the lower limbs 101, 102 of the individual, the actuator system 20 in such a way as to allow the top element 1 to be raised relative to the bottom element 2, and therefore the assisted individual 100 to be supported, to a greater or lesser degree depending on which of the lower limbs 101, 102 is in contact with the ground.

Figure 3:
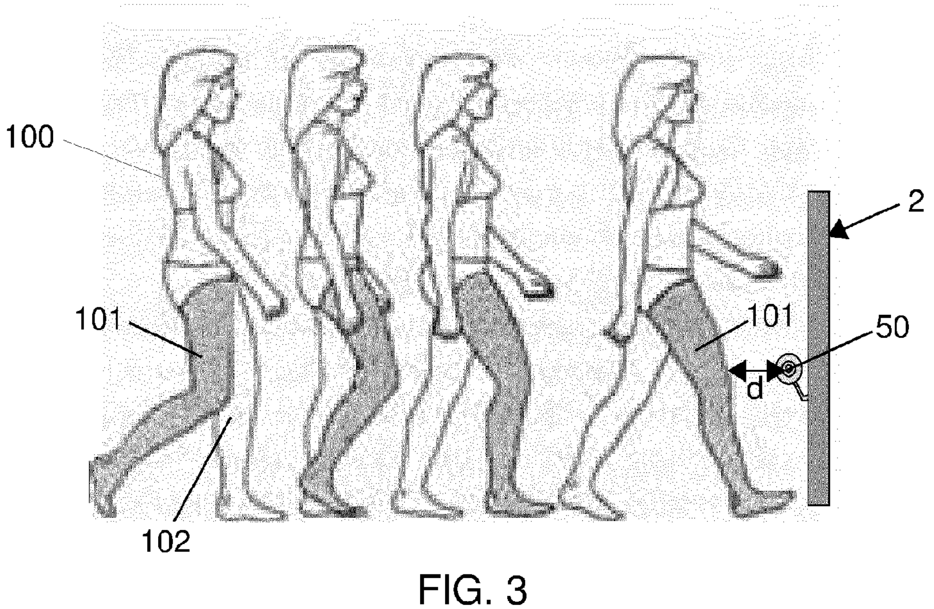
FIG. 3 schematically illustrates the operation of the system for measuring the position of the lower limbs of a device according to the invention, in different phases of a pattern of walking of an individual.

The operation of the system 50 for measuring the position of the lower limbs 101, 102 is illustrated in more detail in FIG. 3, which schematically represents different phases of the pattern of walking of the individual, distinguishing the phase of lift of the right lower limb 101, on the left in the figure, during which this limb is in suspension, the bearing phase during which it is bearing on the ground, on the right in the figure. During this movement, the distance d between the lower limb 101 and the sensors 50 of the system for measuring the position of the limbs, fixed to the bottom element 2 of the device, decreases, whereas the distance between the second lower limb 102 and these same sensors 50 increases. These distance data measured by the sensors 50 are transferred to the support programming and management system of the device, which is advantageously designed in such a way as to be able to send, based on these data, a command to the actuator system 20 to set its actuation direction and amplitude, and thus set a height of the top element 1 relative to the bottom element 2 suited to the desired and preset support for the lower limb, in bearing mode, of the individual.

Figure 4A:
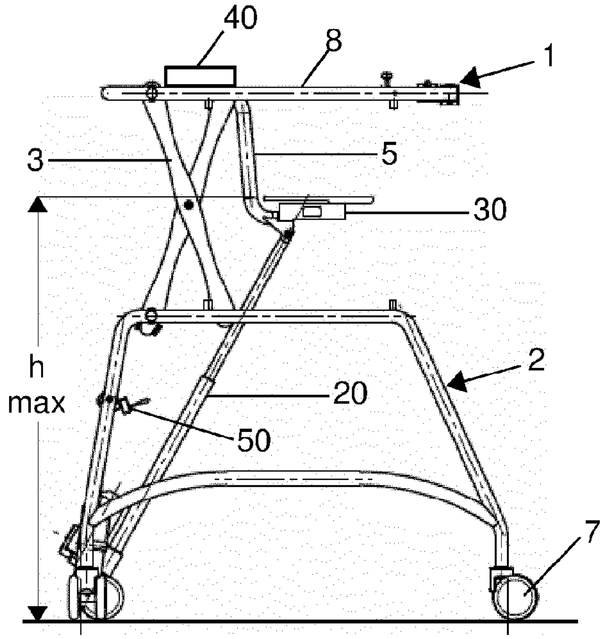
FIG. 4*a* shows, seen from the side, a device according to the invention in a so-called high position, in which the top element of the device is raised to the maximum relative to the bottom element.
Figure 4B:
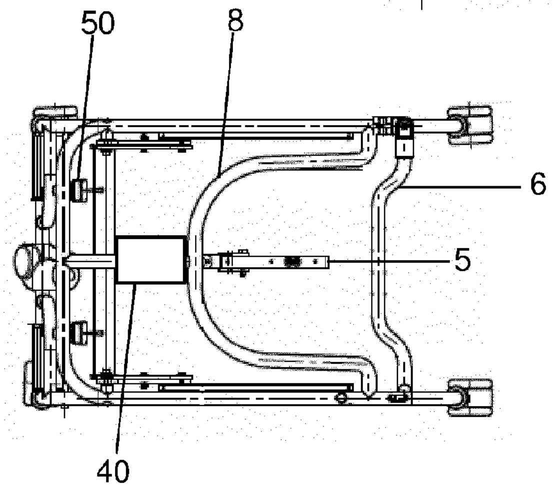
FIG. 4*b* shows the device of FIG. 4*a* in a plan view.
Figure 4C:
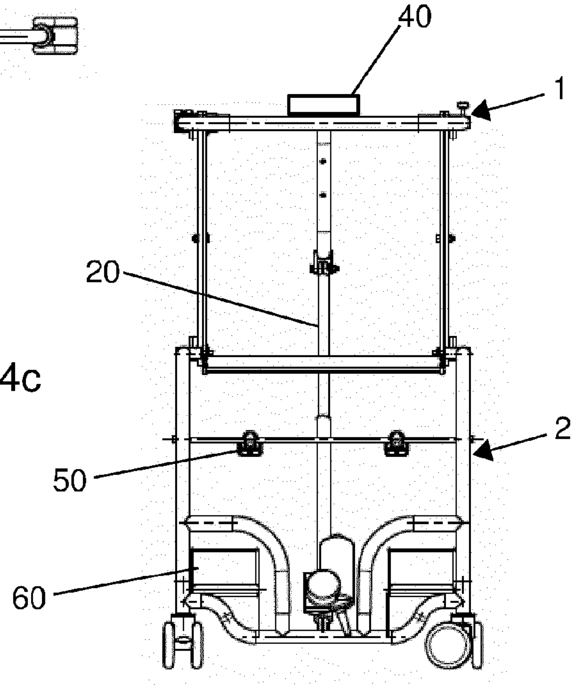
FIG. 4*c* shows the device of FIG. 4*a* in a front view.
Figure 5A:
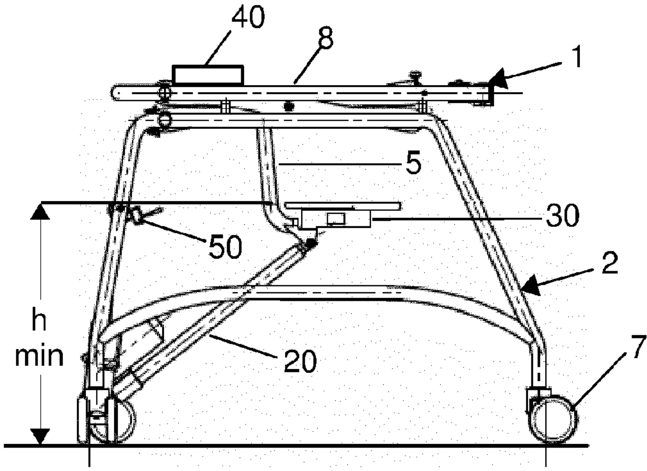
FIG. 5*a* represents, in a side view, the device of FIG. 4*a* in a so-called low position, in which the top element of the device is raised to the minimum relative to the bottom element.
Figure 5B:
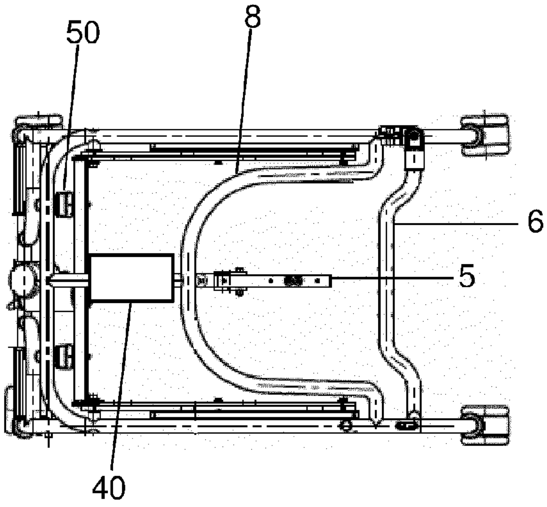
FIG. 5*b* shows the device of FIG. 5*a* in a top view.
Figure 5C:
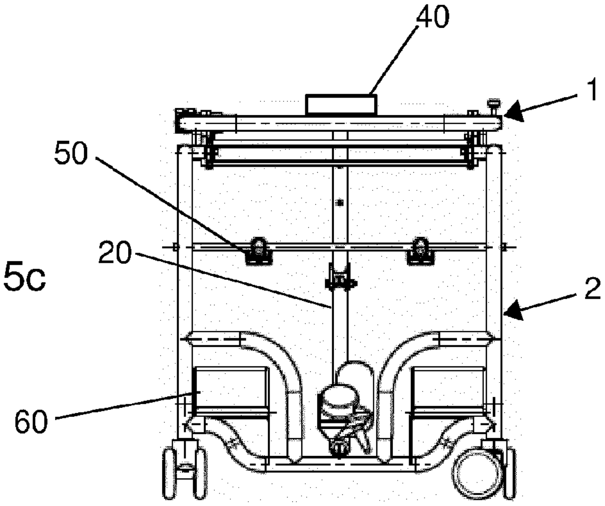
FIG. 5*c* represents the device of FIG. 5*a* in a front view.

An exemplary embodiment of the device according to the invention is represented in more detail in FIGS. 4*a*, 4*b*, 4*c* and in FIGS. 5*a*, 5*b*, 5*c*, respectively in a so-called highest position (maximum height h max between the position of the seat 4 and the ground), and in a so-called lowest position (minimum height h min between the position of the seat 4 and the ground).

These figures contain all the constituent members of the device that are described above, notably the system of gravitational force sensors 30 arranged under the insertion rod 5 of the seat, but with the exception of this positioning seat for the individual 4, which is not represented therein for reasons of clarity of the figures.

The highest position is preferentially set in such a way that, in this position, the assisted individual positioned on the positioning seat 4 is not touching the ground with his or her feet, or he or she is just touching it without truly bearing thereon. For its part, the lowest position is chosen to facilitate the installation of the individual in the device, on the positioning seat.

The operation of the device according to the invention, represented in FIGS. 4*a*, 4*b*, 4*c* and 5*a*, 5*b*, 5*c*, consists overall in creating a synergy between the system of gravitational force sensors 30 and the actuator system 20, by taking into account the data recorded by the system for measuring the position of the lower limbs of the individual 50.

The creation of a synergy between these actuator 20 and gravitational force sensor 30 systems is ensured by a support management and programming method, by means of the support programming and management system which is included in a control unit 40 arranged on the top element 1, on the front thereof relative to the direction of walking of the individual, so as to be easily accessible at any time to this individual. This method makes it possible to program a support previously defined for each of the right or left bearings of the individual, the moments when each of these bearings are made being determined as a function of the measurement of their position relative to the distance sensors 50.

This measurement involves the infrared distance sensors 50 placed on the front of the bottom element 2 of the support structure and capable of detecting the distance d which separates them from each limb of the assisted individual.

The method for implementing the device then makes it possible to sequence the following different phases:

1—positioning of the individual to be assisted on the positioning seat 4 and closure of the rear safety bar 6;

2—positioning of the device in a weighing configuration: total lift of the assisted individual (the top element is brought to the maximum height h max, as illustrated in FIGS. 4*a* to 4*c*) and storage, in the support programming and management system, of the weight value measured by the system of gravitational force sensors 30;

3—programming of the percentage of support of the weight of the body desired for each of the right and left bearings of the individual, using the control unit 40. On each footstep, the percentage of support of the weight of the body varies for example from 0% to 95%, without exceeding 30% of difference between the right and left bearings;

4—positioning of the device in a so-called walking configuration, by adjustment of the height of the top element 1 to a suitable value according to the morphology of the individual and his or her handicap. During the walk, the actuator 20, controlled by the support programming and management system, provides the desired support on each step of the individual, as follows:

right leg load, propulsion and descent slaved to the load, end of propulsion, on the left leg, raising and lowering of load, propulsion and descent slaved, etc.;

5—positioning of the device in a "stop" or "safety" position, in which the top element 1 is brought to the maximum height h max.

During all these phases, the support can be quantified and its value can be accessed by any operator from the support programming and management system.

This support programming and management system is conventional in itself, and preferably of the programmed computer type, comprising at least one microprocessor, and storage means (magnetic hard disk, flash memory, optical disk, etc.) in which is stored a computer program product, in the form of a set of program code instructions to be executed to implement the different steps of processing of the data and of sending instructions to implement the method according to the invention.

The device according to the invention can also be implemented in manual mode, as follows: setting of the height of the top element 1 of the device by the assisted individual using the control unit 40. The support is then not differentiated between right and left bearings.

FIGS. 4*a*, 4*b*, 4*c* and 5*a*, 5*b*, 5*c* reprise the setting up of the device for operation:

In lowest position, illustrated in FIGS. 5*a* to 5*c*, the force exerted by the actuator system 20 on the insertion rod 5 of the seat is zero, the distance between the latter and the ground is then minimum and defines a so-called minimum seat height (h min).

In highest position, illustrated in FIGS. 4*a* to 4*c*, the assisted individual is weighed, the force exerted by the actuator system 20 on the insertion rod 5 of the seat 4 is maximum and the distance between the latter and the ground is also maximum and defines a so-called maximum seat height (h max).

During the walk, the distance between the top element 1 and the ground can vary on each footstep between the two values h min and h max; these two values also correspond to the two extreme energy values of use of the apparatus.

The "stop" or "safety" position meets the height h max of this supporting walking aid device, in such a way as to immobilize the apparatus in the situation most favorable for the assisted individual, in which his or her weight is entirely supported.

The above description clearly illustrates that, by its various features and their advantages, the present invention reaches the objectives that were set for it. In particular, it provides a supporting walking aid device, this support being programmable and being able to be differentiated according to each of the right and left bearings of the assisted individual, a device which particularly meets the needs of the individuals that require safety and empowerment aid through real walking assistance.

This device is aimed at people who have difficulties in using a conventional deambulator or who refuse dependence and the sense of demeaning that are associated with the use of a wheelchair. Its usefulness in the public domain likens it not only to the deambulation and empowerment appliances intended for personal use, but also to the reeducation appliances for professional use intended for the medical and paramedical professions.

The invention claimed is:

1. A walking aid device supporting a weight of a body of an assisted individual, a support provided by the walking aid device to said assisted individual being programmable and differentiated according to each of right or left bearings of said assisted individual, comprising:

a support structure mounted on wheels, which comprises a top element operable to support said individual and a bottom element operable to bear on the ground, said top element being mobile relative to said bottom element on a vertical axis by a sliding system actuated by an actuator system for raising said top element relative to said bottom element, thereby raising said assisted individual;

a system of gravitational force sensors to weigh said top element supporting said assisted individual, the actuator system being slaved to the system of gravitational force sensors;

a system to measure a position of lower limbs of said assisted individual; and a support programming and management system configured to control the actuator system based on the measurement of the position of the lower limbs of said assisted individual performed by the system for measuring the position of the lower limbs of said assisted individual.

2. The device as claimed in claim 1, wherein said top element comprises an insertion rod to which is fastened a positioning seat to position and raise said assisted individual at a pelvis level.

3. The device as claimed in claim 2, wherein the positioning seat comprises a shell comprising a perineal seat, an anterior pubic support and a posterior lumbar support.

4. The device as claimed in claim 3, wherein said top element comprises an accommodation arc limited, at a rear relative to a direction of walking of said assisted individual, by a safety bar that can be closed, and the posterior lumbar support of the shell is pinned to said safety bar.

5. The device as claimed in claim 1, wherein the system of gravitational force sensors comprises one or more strain gauge force sensors to weigh said top element supporting said assisted individual.

6. The device as claimed in claim 2, wherein the system of gravitational force sensors is placed in the medio-sagittal position under the insertion rod.

7. The device as claimed in claim 2, wherein the actuator system comprises means for lifting said top element relative to said bottom element and supporting means differentiated according to each of the right or left bearings of said assisted individual.

8. The device as claimed in claim 7, wherein the actuator system comprises:

a lifting cylinder comprising a foot yoke and a rod yoke, said foot yoke being fixed to said bottom element and the rod yoke being fixed under the insertion rod of the seat; and a supporting cylinder for differentiated support according to each of the right or left bearings, the supporting cylinder exhibiting a shorter travel and a greater actuation speed than the lifting cylinder.

9. The device as claimed in claim 1, wherein the system to measure the position of the lower limbs comprises distance sensors to measure a distance between each lower limb of said assisted individual and said distance sensors while said assisted individual is walking.

10. The device as claimed in claim 9, wherein said distance sensors are infrared sensors.

11. The device as claimed in claim 9, wherein said distance sensors are placed on the front of said bottom element relative to the direction of walking of said assisted individual.

12. A method for implementing a device as claimed in claim 1, comprising the steps of:

deducing from measurement data concerning positions of the lower limbs of said assisted individual with respect to data recorded by the system of gravitational force sensors, which lower limb of said assisted individual is bearing on the ground;

programming a support previously defined for each of the right or left bearings; and sequencing different phases of the use of the device in an automatic mode which comprises:

a weighing phase to totally lift said assisted individual supported by said top element relative to ground and storing a weight value measured by the system of gravitational force sensors;

a programming phase to program a percentage of support for a weight of a body of said assisted individual for each of the right and left bearings;

an assisted support phase, for each footstep, to provide a support corresponding to the left bearing and for providing a support corresponding to the right bearing; and a stop phase to immediately stop a movement of the actuator system in a total lift position.

* * * * *